United States Patent [19]
Riviere

[11] Patent Number: 5,359,680
[45] Date of Patent: Oct. 25, 1994

[54] INTEGRATED ELECTRO-OPTICAL MODULATION DEVICE

[75] Inventor: Luc Riviere, Sophia Antipolis, France

[73] Assignee: Thomson-CSF, Puteaux, France

[21] Appl. No.: 70,460

[22] PCT Filed: Dec. 10, 1991

[86] PCT No.: PCT/FR91/00994

§ 371 Date: Oct. 12, 1993

§ 102(e) Date: Oct. 12, 1993

[87] PCT Pub. No.: WO92/10780

PCT Pub. Date: Jun. 25, 1992

[30] Foreign Application Priority Data

Dec. 14, 1990 [FR] France .................................. 90 15678

[51] Int. Cl.$^5$ ........................ G02B 6/12; G02B 6/10
[52] U.S. Cl. ................................ 385/9; 385/3; 385/8; 385/14; 385/15; 385/40; 385/45; 385/129; 385/132
[58] Field of Search .......... 385/1, 2, 3, 4, 8, 9, 385/39, 40, 45, 46, 129, 130, 131, 132, 14, 15, 42

[56] References Cited

U.S. PATENT DOCUMENTS

| | | | |
|---|---|---|---|
| 4,468,085 | 8/1984 | Papuchon et al. | 385/45 X |
| 4,709,978 | 12/1987 | Jackel | 385/45 X |
| 4,820,009 | 4/1989 | Thaniyavarn | 385/2 |
| 4,969,701 | 11/1990 | Papuchon et al. | 385/2 |
| 5,111,517 | 5/1992 | Riviere | 385/45 X |
| 5,119,447 | 6/1992 | Trinso | 385/2 |
| 5,123,069 | 6/1992 | Okayama et al. | 385/45 X |
| 5,163,106 | 11/1992 | Okayama et al. | 385/45 |
| 5,233,453 | 8/1993 | Sivarajan et al. | 385/45 X |
| 5,253,309 | 10/1993 | Nazarathy et al. | 385/4 |
| 5,278,923 | 1/1994 | Nazarathy et al. | 385/3 |
| 5,293,436 | 3/1994 | Diemeer | 385/45 X |

FOREIGN PATENT DOCUMENTS

| | | | |
|---|---|---|---|
| 0361152 | 4/1990 | European Pat. Off. | 385/45 X |
| 2190512 | 11/1987 | United Kingdom | 385/45 X |

OTHER PUBLICATIONS

Applied Physics Letters, vol. 53, No. 20, 14 Nov. 1988, New York US, pp. 1908-1910; Y. Bourbin et al.: 'Intrinsically resonant traveling-wave Y-fed directional couplers at high frequency'.

IEEE Transactions on Microwave Theory and Techniques. vol. 38, No. 5, May 1990, New York US, pp. 669-673, T. R. Halemane, et al.: 'Distortion characteristics of optical directional coupler modulators'.

IEEE Journal Of Quantum Electronics. vol. QE-22, No. 12, Dec. 1986, New York US, pp. 2191-2194; K. T. Koai, et al.: "Digital and quasi-linear electrooptic modulators synthesized from directional couplers".

*Primary Examiner*—Brian Healy
*Attorney, Agent, or Firm*—Oblon, Spivak, McClelland, Maier & Neustadt

[57] ABSTRACT

An electro-optical modulator system obtained by linking a modulator incorporating a Y-junction coupler having a length Ll(101-108) to a passive coupler (104,105) whose length L2 in relation to the coupling length LC2 is determined so as to cancel substantially the third order distortions of the modulator. The resulting modulator has all of its even distortions cancelled and its uneven distortion is substantially zero. Furthermore, the rate of decay can potentially be zero.

13 Claims, 4 Drawing Sheets

INTEGRATED ELECTRO-OPTICAL MODULATION DEVICE

BACKGROUND OF THE INVENTION

1. Field of the Invention

This application is a 371 of PCT/FR91/00994, filed Dec. 10, 1991.

The present invention relates to devices allowing modulation of an optical signal from an electric signal. Devices of this kind are most frequently incorporated into the surface of a substrate made from a material whose optical properties are changed under the effect of an electric field applied to it. These devices make it possible, in particular, to modulate a light signal in order to be able to transmit analog signals, e.g., television signals, over an optical fiber.

2. Discussion of Background

To modulate an optical signal using an analog signal, use must be made of a modulator whose electro-optical response is the most linear possible, in order to avoid excessive distortion of the signal to be transmitted. Linearity tolerances may be greater of lesser, depending on the signals to be transmitted; however, they are especially reduced in the very important instance of a set of television channels transmitted under amplitude modulation with reduced sideband (AMRS).

Various modulator structures are known, some of which make it possible to cancel out even non-linearities using the symmetry of the electro-optical response. On this subject, *IEEE Transactions: Microwave Theory and Techniques*, Vol. 28, No. 5, May 1990, article of Halemane and Korotky, p. 673, may be consulted.

In an article published in *IEEE Journal of Quantum Electronics*, Vol. 22, No. 12, December 1986, pp. 2191–2194, Kwang Tsai Koai et al. suggested a modulator structure based on a directional coupler allowing good linearity. This structure improves in their entirety the properties of the directional coupler, but does not make it possible to cancel out the even-numbered or third-order terms.

SUMMARY OF THE INVENTION

To obtain good linearity while canceling out even-numbered and at least third-order terms, the invention puts forth an electro-optical device characterized mainly by the fact that it comprises, on an electro-optical substrate:

- a first section comprising a Y-junction designed to receive the optical signal to be modulated and to divide it into two identical parts;
- a second section comprising two parallel optical guides intended to receive the two parts of the optical signal emerging from the first section, these guides being coupled over a first length L1 so as to determine a coupling length lc1 and the second section further comprising two first electrodes extending on the substrate and along and to the outside of the guides, in order to receive the electric modulation signal and to apply an electric modulation field to the guides;
- a third section in which the optical guides are extended while remaining parallel and coupled over a second length L2 so as to determine a second coupling length lc2; and
- a fourth section which separates the optical guides and furnishes two modulated optical signals of different intensities.

BRIEF DESCRIPTION OF THE DRAWINGS

Other features and advantages of the invention will emerge clearly from the following description provided as a non-restrictive example with reference to the attached drawings, in which.

DESCRIPTION OF THE PREFERRED EMBODIMENTS

Figure 1:
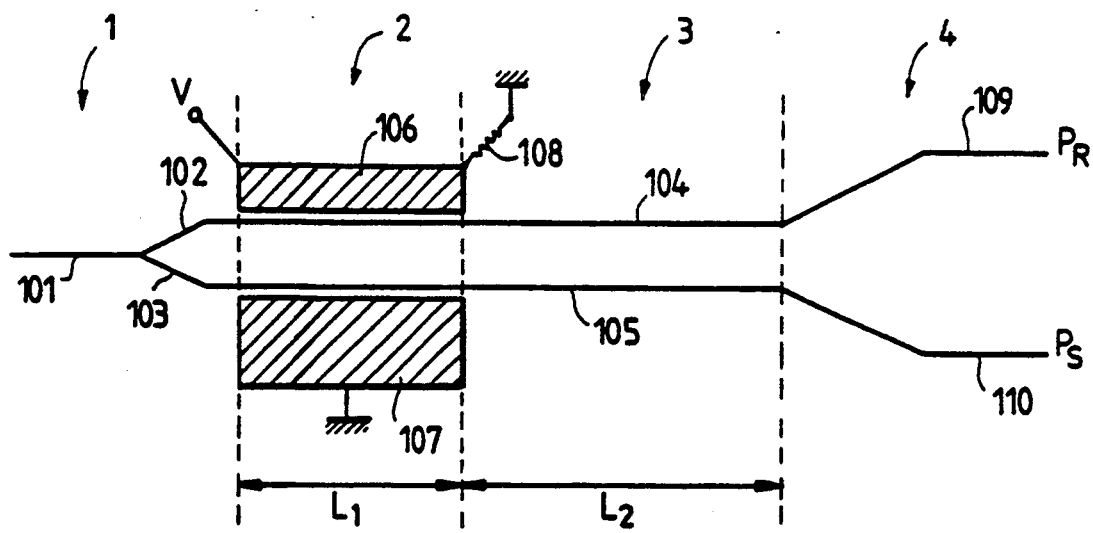
FIG. 1 is a layout diagram of a modulator according to the invention.

In the embodiment illustrated in FIG. 1, the coupler according to the invention consists of four parts 1 to 4.

The first part 1 comprises a convention Y-junction in which the light signal arriving through an input guide 101 is divided into two substantially-equal parts by means of two arms 102 and 103 which branch off from the guide 101.

These arms feed two parallel guides 104 and 105 which pass through parts 2 and 3.

In the part 2, two electrodes 106 and 107 extend along and to the outside of these guides. The term "outside" as used here has a purely conventional meaning used to describe the invention. The exact position in relation to the guides depends, in conventional fashion, on the material and the cut used. Thus, using $LiNbO_3$ in the Z cut, the electrodes partially overlap the guides. The electrode 107 is grounded, while the electrode 106 is connected, on one side, to a modulation source which applies to it an electric signal V, and, on the other, to ground by means of a resistor 108, which is itself grounded. This electrode-feed system is shown in a purely illustrative way and is dependent basically on the configuration of the output stage furnishing the signal V. The essential point is that these electrodes make it possible to apply to the electro-optical substrate, to which the entirety of the device is incorporated, an electric field which follows the modulation of the signal V and which produces variation, according to the timing of this modulation, of the optical characteristics of the substrate, and, accordingly, of the propagation characteristics of the light signal in the guide portions 104 and 105 located in section 2 of the device.

In this embodiment, the guides 104 and 105 then extend through section 3 in the extensions of their paths in section 2 (and are thus spaced apart by the same distance).

Subsequently, in section 4 these guides move away from each other, so that the interaction between them ceases. They then reach the output guides 109 and 110, which supply the modulated optical signals $P_R$ and $P_S$, respectively.

Because the lengths of the guides 104 and 105 extending through sections 2 and 3 are equal to $L_1$ and $L_2$, respectively, the optical powers $P_R$ and $P_S$ at the output of the modulator are given by the following, $P_1$ being the input power over the guide 101:

$$P_R = \frac{P_i}{2} 1 - X\frac{Y}{\gamma^2} [1 - \cos(\pi Y)]\cos(\pi\theta) + \frac{\sin(\pi\gamma)}{\gamma} \sin(\pi\theta)$$

-continued
$$P_S = \frac{P_i}{2} 1 - X\frac{Y}{\gamma^2} [1 - \cos(\pi Y)]\cos(\pi\theta) + \frac{\sin(\pi\gamma)}{\gamma} \sin(\pi\theta)$$

where:

$$X = \frac{\Delta\beta_{eo} L_1}{\pi}$$

$$\gamma = \sqrt{X^2 + Y^2}$$

$$\theta = \frac{L_2}{l_{c2}}$$

$$Y = \frac{L_1}{l_{c1}}$$

In these formulae, $\Delta\beta eo$ is the phase shift induced between the two guides because of the Pockels effect in the material used, and X is thus proportional to the signal V. Moreover, lc1 and lc2 are the known coupling lengths in sections 2 and 3; here as [word missing?] the spacing separating the guides is the same in these sections: lc1=lc2=lc.

It is observed that, when $\theta$ is a whole number, a response matching that of a conventional Y-coupler is obtained.

When $\theta$ is not a whole number, the presence of the passive zone corresponding to section 3 means that the electro-optical response is composed of two terms whose respective weights depend on the value of $\theta$, i.e., on the length of the passive zone.

Since the electrical response is symmetrical, all even-ordered distortions are canceled out. Furthermore, the third-order non-linearity can be canceled out, this non-linearity being the most troublesome because it create a third-order intermodulation, by choosing a suitable value of $\theta$ such that the third-order distortions of the first and second terms compensate for each other. This suitable value of $\theta$ is given by the equation:

$$\tan(\pi\theta) = \frac{2 - \pi Y \sin(\pi Y) - 2\cos(\pi Y)}{\pi Y \cos(\pi Y) - \sin(\pi Y)}$$

In the special case when the lengths L1 and L2 are such that $$\frac{L1}{lc1} = 0.794 \text{ and } \frac{L2}{lc2} = 0.784,$$

not only does the linearized modulator have zero even-numbered and third-order distortions, but its rate of decay is infinite; i.e., $P_R$ or $P_S$ is zero for a determinate voltage Vsat. In other words, when V=Vsat, all of the light is modulated and emerges through a single one of the two output guides. All of the optical power can thus be modulated.

Furthermore, for values of L1/lc1 of between 0.73 and 0.86, there is always a length of L2 which simultaneously makes possible cancellation of the third-order distortion and a rate of decay of more than 20 dB.

Figure 3:
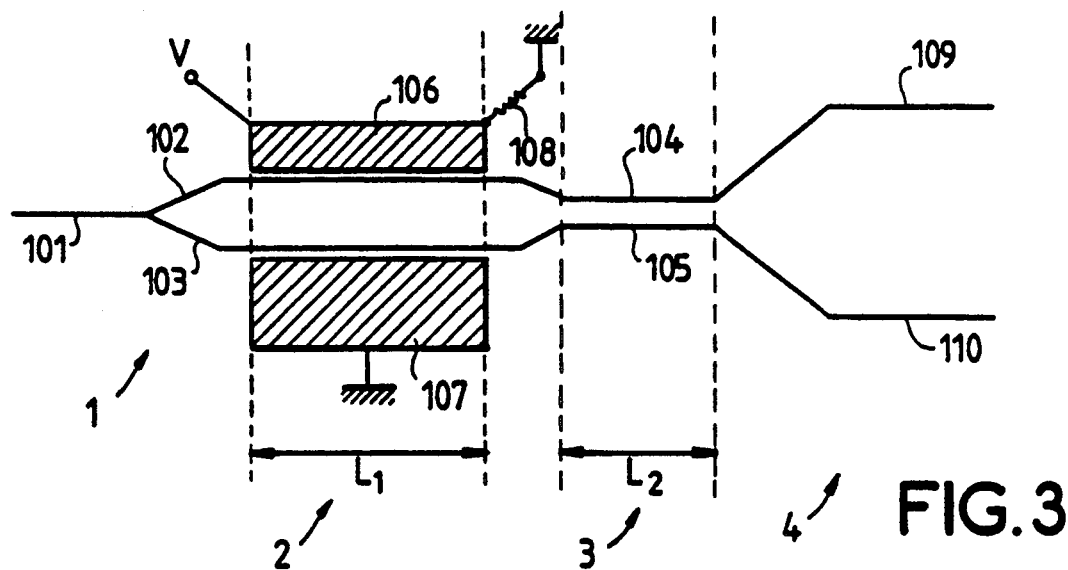
FIGS. 3 to 7 illustrate layout diagrams of variants of the modulator in FIG. 1.

It is found that the ratio L2/lc2 plays an important role in the invention. In particular, if it is desired to reduce the overall length of the component, given that the length L1 determines the action of the electric signal and that it is thus not desirable to reduce that length excessively, it is-possible, in order to reduce L2, to bring the guided closer together in section 3, as shown in FIG. 3, and thus, to also reduce lc2.

Figure 2:
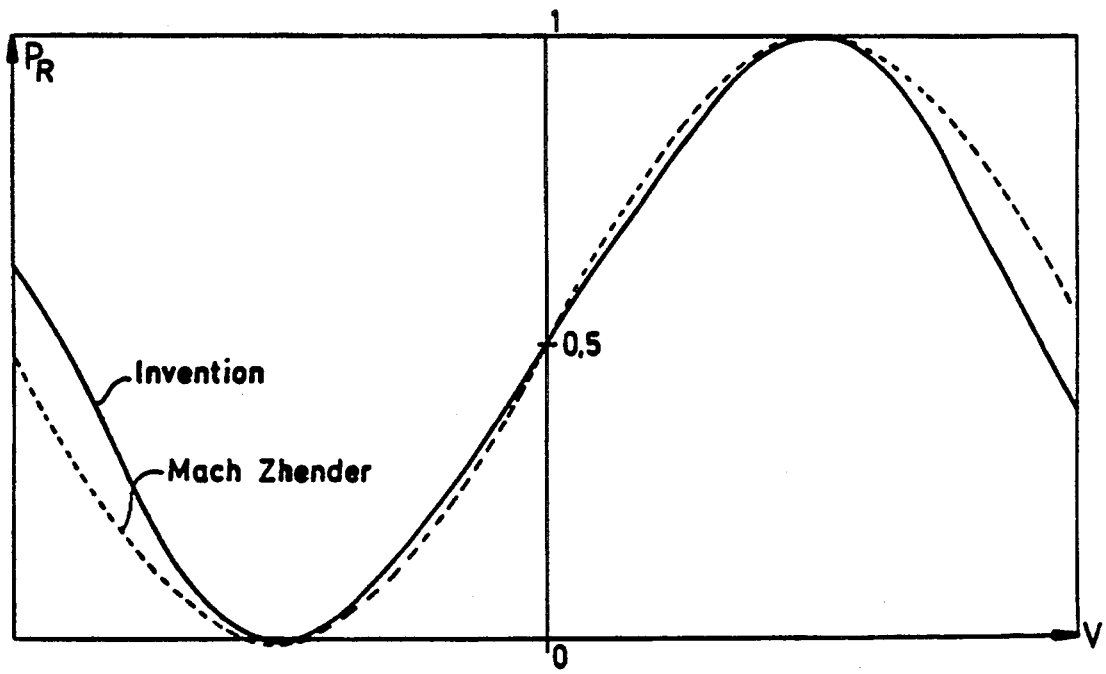
FIG. 2 illustrates modulator-response curves.

FIG. 2 represents the modulation property, i.e., the power $P_R$ in the output guide 109 as a function of the modulation voltage V, these two values being standardized at 1 for a Mach-Zehnder self-skewed modulator (dotted-line curve) and for a modulator according to the invention in the special case described above, in which a perfect rate of decay exists (continuous curve). This graph reveals the superiority of the modulator according to the invention as compared with prior art represented by the Mach-Zehnder modulator.

Figure 4:
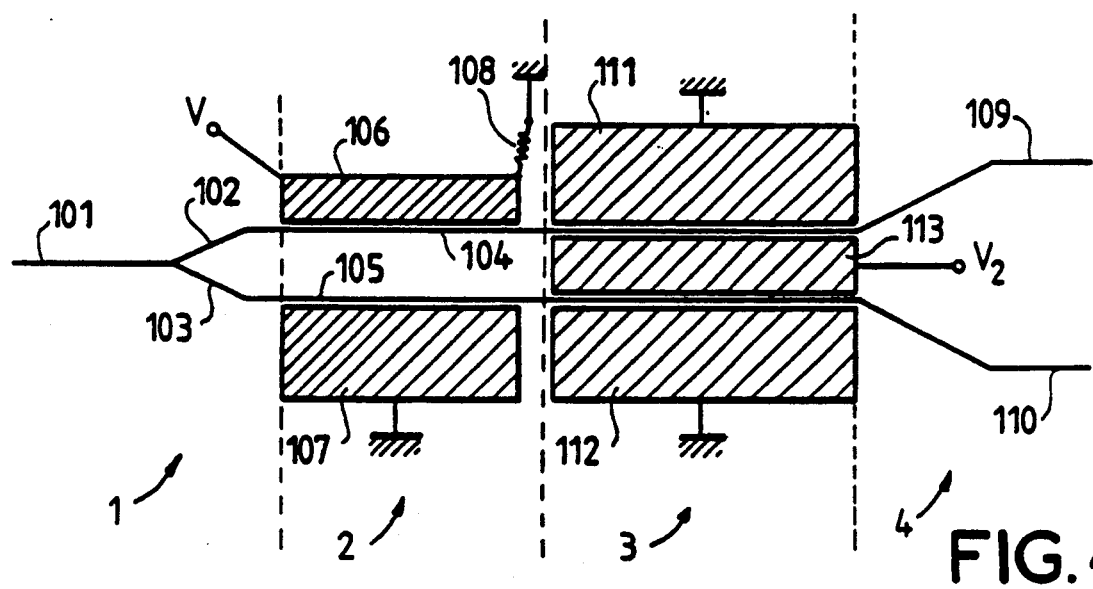

In a variant of the invention illustrated in FIG. 4, use is made in section 3 of two electrodes 111 and 112 extending along and to the outside of the guides 104 and 105, and an electrode 113 extending along and between these two guides. By grounding the external electrodes 111 and 112 and by applying to the internal electrode 113 a continuous but adjustable voltage V2 (or vice-versa), the performance of section can be electrically modified. Indeed, the electric field applied by the electrodes 106 and 107 acts differentially on the guides so as to obtain the modulation, while the field applied by the electrodes 111 to 113 acts symmetrically on the guides without modifying the distribution of energy between them, but rather acts simply on the coupling factor so as to modify the parameter 0. Accordingly, this factor can be adjusted to cancel optimally the third-order distortion, by using, for example, a zero method. This makes it possible, for example, to avoid the sorting of components at the end of manufacture and/or to reduce manufacturing tolerances.

Figure 5:
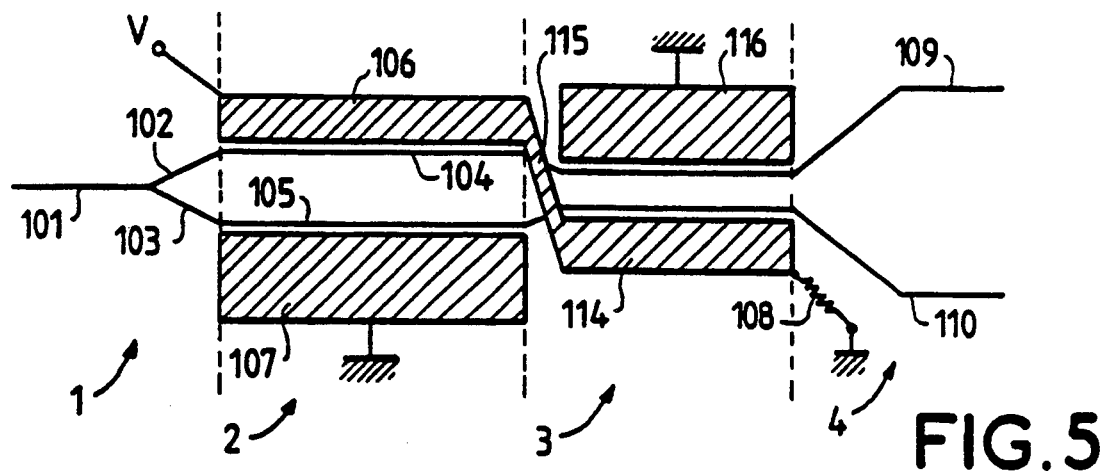

The structures described above can be put into widespread use by applying the modulation to sections 2 and 3 with different electro-optical overlappings on these two sections, as in FIG. 5 in which the electrode 106 is extended in section 3 to the outside of and along the guide 105, after having cleared the guides 104 and 105 using a bridge 115. Another electrode 116 extends along the guide 104, contrary to the electrode 114, so as to be able to apply the field between the two guides in section 3. This electrode 116 is grounded, and the electric field is thus, in section 3, the reverse of the field in section 2. An additional degree of freedom is thus provided in choosing suitable the lengths of each section, the spacing separating the guides, and the electro-optical overlappings. This additional freedom makes it possible, for example, to minimize fifth-order distortions. It can be further observed that, by canceling the length of the electrodes in section 3 in FIG. 5, the structure in FIG. 3 is repeated.

Figure 6:
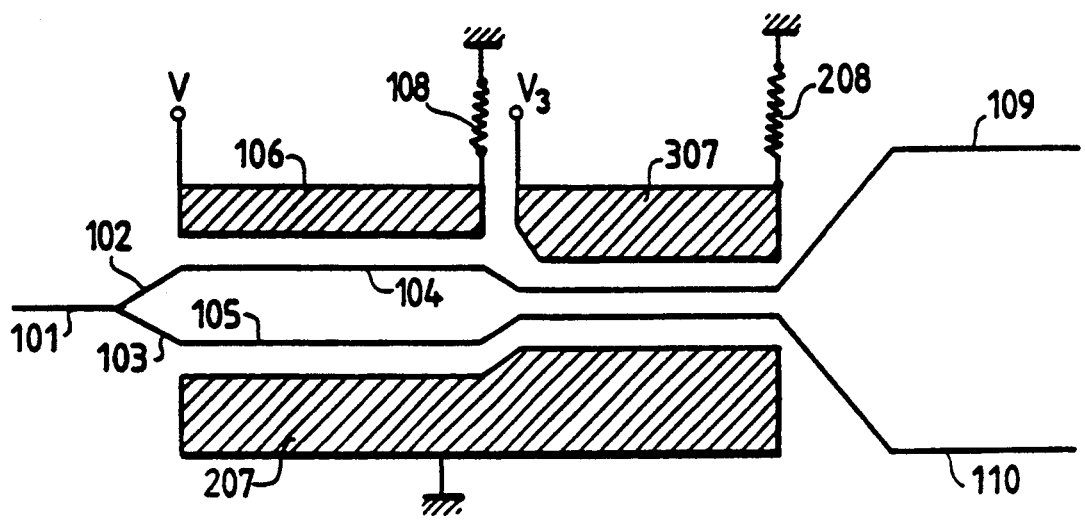

The most widely-applicable variant is shown in FIG. 6, in which the electrode 207 extends along the entire guide 105 and the electrode 307, along the guide 104 in section 3 on the same side as the electrode 106. A voltage $V_3$ applied to the electrode 307 is adjustable, so as to obtain the desired result, as described above. It may change polarity in order to obtain the same result as in FIG. 5 by avoiding the bridge 115. This voltage $V_3$ is preferably obtained from the voltage V using means making it possible to obtain $V_3 = \alpha V$, where $\alpha$ is the adjustable parameter, which may be negative.

Moreover, using electronic means which measure the distortion rate, it is possible to adjust this voltage $V_3$ in real time, and thus the value of $\alpha$, to minimize the residual distortion rate.

Finally, for some applications, it may be desirable to reduce uneven higher-order distortions (5, 7, etc.), at the cost of a slight residual third-order distortion. To this end, a value of $\theta$ will be chosen which minimizes these higher-order distortions and which, consequently, allows a degree of third-order distortion to persist.

Figure 7:
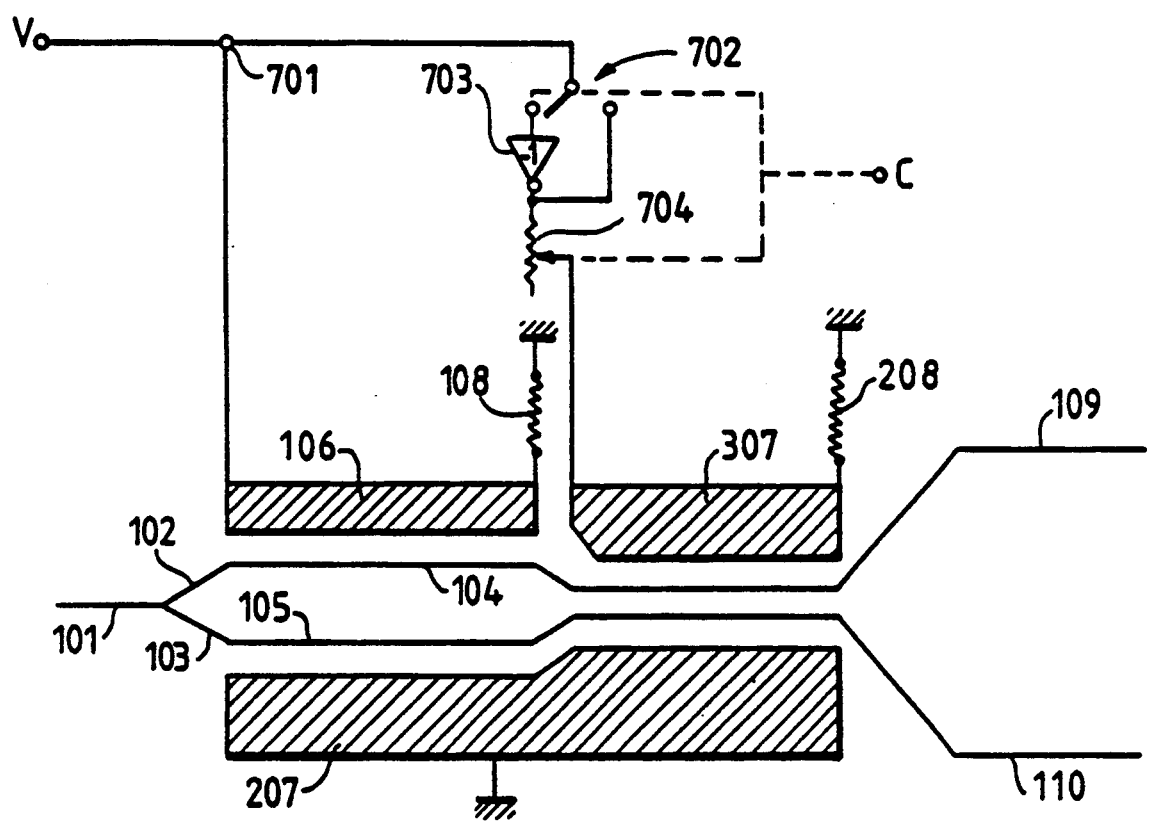

This may be obtained, as shown in FIG. 7, by feeding the electrodes 106 and 307 with the same voltage V using a radio-frequency separator 701. 106 is fed directly, and 307 is fed by a switch 702 making it possible to select or not an individual reversing switch 703. A potentiometer 704, e.g., electronic, then makes it possible to apply the voltage $\alpha V$ or $-\alpha V$ to 307.

I claim:

1. An Electro-optical modulation device, comprising, on an electro-optical substrate:
    a first section comprising a Y-junction designed to receive the optical signal to be modulated and to divide it into two identical parts;
    a second section comprising two parallel optical guides for receiving the two parts of the optical signal emerging from the first section, said guides being coupled over a first length L1 so as to determine a coupling length lc1 and the second section also comprising two first electrodes extending on the substrate and along and to the outside of the guides, in order to receive the electric modulation signal (V) and to apply an electric modulation field to the guides;
    a third section in which the optical guides are extended while remaining parallel and coupled over a second length L2 so as to determine a second coupling length lc2; and
    a fourth section which separates the optical guides and furnishes two modulated optical signals ($P_R$, $P_S$) of different intensities;
    wherein said device is characterized by the fact the ratio L1/Lc1 is between 0.73 and 0.86, and the length of L2 is chosen so as to cancel the third-order distortion and obtain a rate of decay greater than 20 dB.

2. Device according to claim 1, wherein the ratio L1/Lc1 is substantially equal to 0.794 and the ratio L2/Lc2, to 0.784.

3. Device according to any of claims 1 or 2, wherein the space separating the optical guides is the same in the second and third sections.

4. Device according to either of claims 1 or 2, wherein the space separating the optical guides is different in the second and third sections.

5. Device according to any of claims 1 or 2, wherein said device does not incorporate, in its third section, any means allowing application of an electric field to the guide.

6. Device according to any of claims 1 or 2, wherein said device comprises, in its third section, two second electrodes extending along and to the outside of the guides and connected to a common potential, and a third electrode 113 extending along and between the guides and intended to receive a continuous adjustable electric signal making it possible to modify the coupling length lc2 of the third section.

7. Device according to any of claims 1 or 2, wherein one of the first two electrodes is extended within the third section so as to extend to the outside of and along the guide to which it is not contiguous in the first section, and wherein it further comprises a fourth electrode extending to the outside of and along the other guide in the third section, said fourth electrode being connected to the same potential as that of the two first electrodes, which do not extend into the third section.

8. Device according to any of claims 1 or 2, wherein the length L2 of the guides in the third section and the coupling length lc2 of these same guides in this third section are determined so as to cancel the third-order distortion.

9. Device according to any of claims 1 or 2, wherein the length L2 of the guides in the third section and the coupling length lc2 in this third section are determined so as to reduce uneven distortions of an order greater than 3, while minimizing the third-order distortions without canceling it completely.

10. Device according to any of claims 1 or 2, wherein the lengths of the guides in the second and third sections, and the corresponding coupling lengths make it possible to obtain an infinite rate of decay on one of the signals ($P_R$, $P_S$) emerging from the modulator.

11. Device according to any of claims 1 or 2, wherein one of the two first electrodes extends into the third section so as to extend to the outside of and along one of the guides to which it is contiguous in the first section, and wherein said device further comprises a fifth electrode extending to the outside of and along the other guide in the third section, said fifth electrode being designed to receive an electric correction signal ($V_3$).

12. Device according to claim 11, wherein said electric correction signal is proportional ($\alpha V$) to said electric modulation signal (V).

13. Device according to claim 12, wherein said device further incorporates means for separating said electric modulation signal (V) into two parts and for applying said parts, first, to said first electrode limited to the second section, and second, to a switch making it possible optionally to shunt an individual reversing switch, then to a potentiometer intended to feed said fifth electrode.

* * * * *